(No Model.)
A. H. KENT, Dec'd.
E. D. CLARK, Administrator.
MILLING TOOL.
No. 534,220. Patented Feb. 12, 1895.
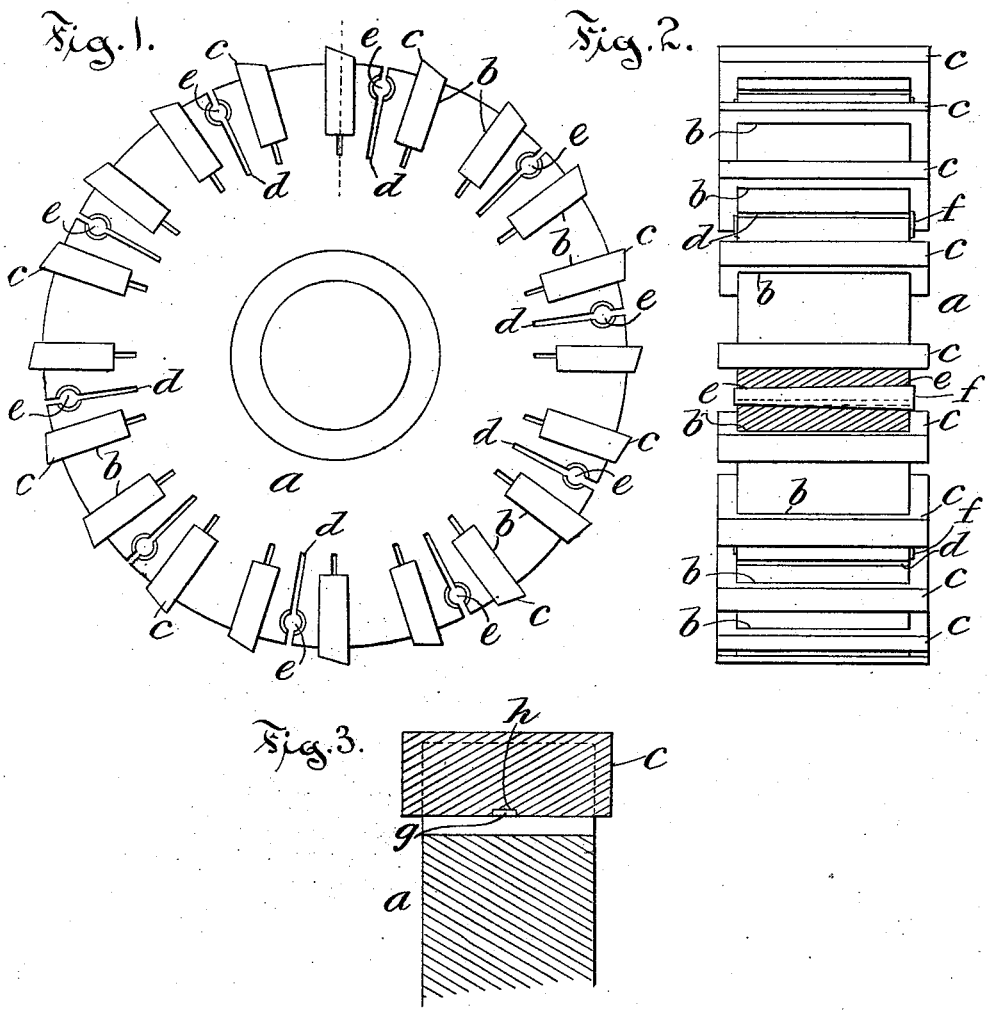
Witnesses:
Joseph Arthur Cantin
Arthur B. Jenkins
Inventor:
Albert H. Kent
By Simonds, Burdett & Frothingham
Attys

UNITED STATES PATENT OFFICE.

ALBERT H. KENT, OF HARTFORD, CONNECTICUT; EDGAR D. CLARK, ADMINISTRATOR OF SAID KENT, DECEASED, ASSIGNOR TO THE PRATT & WHITNEY COMPANY, OF SAME PLACE.

MILLING-TOOL.

SPECIFICATION forming part of Letters Patent No. 534,220, dated February 12, 1895.

Application filed December 4, 1893. Serial No. 492,806. (No model.)

*To all whom it may concern:*

Be it known that I, ALBERT H. KENT, of Hartford, in the county of Hartford and State of Connecticut, have invented certain new and useful Improvements in Milling-Tools, of which the following is a full, clear, and exact description, whereby any one skilled in the art can make and use the same.

The object of my invention is to provide what is known in the shops as an inserted tooth mill with means for securely clamping the removable teeth in the body part of the cutter, and to this end my invention consists of the details of the several parts making up the cutter body and the tooth holding clamp as more particularly hereinafter described and pointed out in the claims.

Referring to the drawings: Figure 1 is a detail view in side elevation of one of my improved milling tools. Fig. 2 is a detail edge view of such tool with a part broken away to show the plug and its socket. Fig. 3 is a detail view of part of the disk in transverse section on a plane parallel to the axis of the cutter-shaft.

In the accompanying drawings the letter $a$ denotes the cutter body which is preferably a circular disk of metal of the required thickness, determined by the use to which the cutter as a whole is to be put. If the device is to be used simply as a face cutter then only that width or thickness of the body required to hold the teeth or cutters will be used, but if the cutter is to be used for milling out a channel of a desired width the cutter body will have a thickness depending upon the distance between the opposite cutting edges of the teeth or cutters, which in that instance have cutting edges formed on their opposite ends.

The cutter-body $a$ is adapted to be held on a cutter shaft which passes through an opening in the cutter-body, and the periphery of the latter is provided with a suitable number of cutter or tooth sockets $b$ in which the cutters or teeth $c$ are adapted to be held.

The segment of the cutter-body located between two adjacent teeth has a transverse slot $d$ extending a sufficient distance toward the center of the cutter-body to render the two parts of the segment slightly elastic, and a plug-socket $e$ is formed in the line of the slot $d$, that is, the slot opens in opposite directions from the cutter socket, one line extending to the periphery and the other toward the center of the cutter body. This plug socket is required only in alternate segments as each alternate segment forms an abutment against which the cutter or tooth is pressed when the expanding sections are moved by the insertion of a taper plug $f$.

In the operation of my device the teeth or cutters $c$ are inserted in the cutter sockets in the proper position for cutting, and a taper-plug is inserted in each of the plug sockets $e$ and driven in it a degree sufficient to securely clamp the teeth $c$ in place in their sockets by expanding the parts of the segment in which the slot $d$ and plug-socket $e$ are formed.

Where needed or desired in order to give a greater elasticity to the expanding segment of the cutter-body each cutter socket may be extended by a slot cut in toward the center of the body from the bottom of the cutter socket.

In order to prevent the cutter or tooth from being moved when its cutting edge is located on the side of the disk the cutter-body may be checked or roughened by transverse or cross lines forming indentations, or a specific shoulder or stop, such as is shown in Fig. 3, may be provided, the stop consisting either of a shoulder on the tooth or cutter engaging the edge of the cutter body, or of a specific pin $g$ on the one part projecting into a socket $h$ in the other.

The main advantage in my improved milling tool and the cutter holding device is due to the fact that the tapered plug is located in a line substantially parallel to the cutters or teeth, and by its operation causes each tooth to be clamped lengthwise of the tooth and practically along its whole length, the greater binding force coming near the outer edges of the socket and near to the cutting edge of the tooth.

The cutter-body may be made of iron cast to shape, of steel or of other suitable material formed to shape in any ordinary or desired manner, the main feature of my invention residing not in the material or particular form of the cutter body, but in the means employed for clamping the removable teeth in place in the cutter-body.

I claim as my invention—

1. In a milling tool in combination with the cutter body having peripheral sockets, an expanding segment having the transverse plug socket and slots extending therefrom to the periphery and toward the center of the cutter body, and the tapered plug adapted to be inserted in the plug socket and whereby the segment is expanded, all substantially as described.

2. In a milling tool in combination with the disk shaped cutter-body having transverse peripheral cutter sockets, the alternate segments between the sockets each having the transverse plug socket and slots extending therefrom to the periphery and toward the center of the cutter-body, and a tapered plug adapted to be inserted in the plug socket, all substantially as described.

ALBERT H. KENT.

Witnesses:
ARTHUR B. JENKINS,
JOSEPH ARTHUR CANTIN.